United States Patent
Igura

(10) Patent No.: US 8,819,096 B2
(45) Date of Patent: Aug. 26, 2014

(54) FFT COMPUTING APPARATUS AND POWER COMPUTING METHOD

(75) Inventor: Hiroyuki Igura, Tokyo (JP)

(73) Assignee: NEC Corporation, Tokyo (JP)

( * ) Notice: Subject to any disclaimer, the term of this patent is extended or adjusted under 35 U.S.C. 154(b) by 480 days.

(21) Appl. No.: 13/147,738

(22) PCT Filed: Feb. 3, 2010

(86) PCT No.: PCT/JP2010/051491
§ 371 (c)(1),
(2), (4) Date: Aug. 3, 2011

(87) PCT Pub. No.: WO2010/090209
PCT Pub. Date: Aug. 12, 2010

(65) Prior Publication Data
US 2011/0289130 A1 Nov. 24, 2011

(30) Foreign Application Priority Data
Feb. 5, 2009 (JP) ................................. 2009-025309

(51) Int. Cl.
*G06F 15/00* (2006.01)

(52) U.S. Cl.
USPC ....................................................... 708/404

(58) Field of Classification Search
CPC ..... G06F 17/142; G06F 7/768; G06F 17/141; H04L 27/265; H04L 27/2628
USPC ................................................... 708/400–409
See application file for complete search history.

(56) References Cited

U.S. PATENT DOCUMENTS

| | | | |
|---|---|---|---|
| 5,726,974 A | 3/1998 | Kunieda et al. | |
| 6,700,515 B2 | 3/2004 | Asami | |
| 7,164,723 B2 * | 1/2007 | Sunwoo | 708/409 |
| 2005/0213689 A1 | 9/2005 | Matsuda et al. | |

FOREIGN PATENT DOCUMENTS

| | | |
|---|---|---|
| JP | 9-8765 A | 1/1997 |
| JP | 2000-231552 A | 8/2000 |
| JP | 2002-71723 A | 3/2002 |
| JP | 2002-261727 A | 9/2002 |
| JP | 2005-260337 A | 9/2005 |
| JP | 2006-33074 A | 2/2006 |
| JP | 2006-324859 A | 11/2006 |

* cited by examiner

*Primary Examiner* — Tan V. Mai
(74) *Attorney, Agent, or Firm* — Foley & Lardner LLP

(57) ABSTRACT

In an FFT computing apparatus, a computation-unit switching detection unit detects timing at which a complex multiplication is not being carried out in said butterfly computation of FFT computation, and a complex-multiplication power-computation unit switches computation between complex multiplication and power computation, based on a detection result by said computation-unit switching detection unit. The complex-multiplication power-computation unit performs power computation at timing at which complex multiplication is not carried out in said butterfly computation of FFT computation.

10 Claims, 10 Drawing Sheets

COMPARATIVE CASE

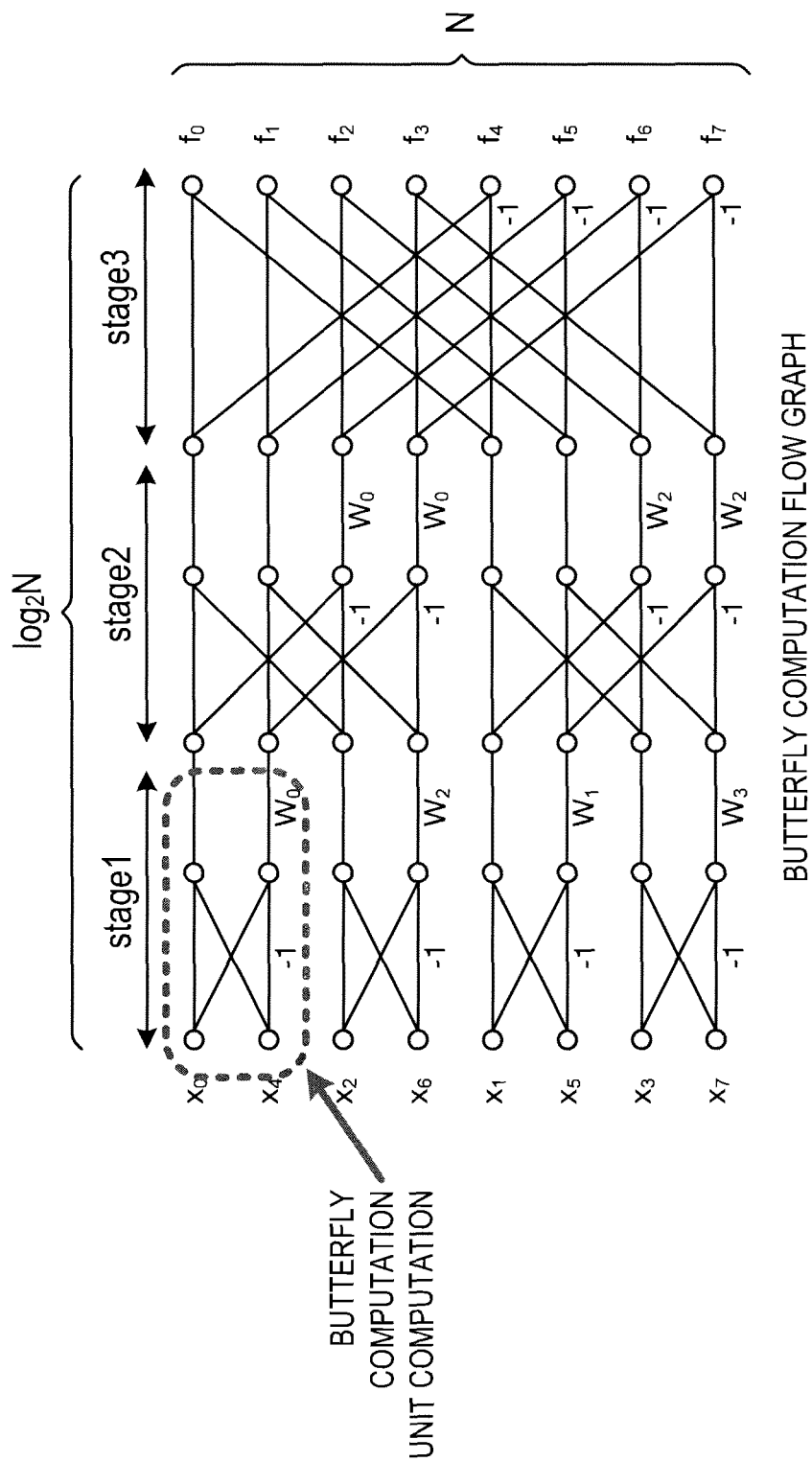

NORMAL STAGE BUTTERFLY COMPUTATION

FINAL STAGE BUTTERFLY COMPUTATION

NORMAL STAGE

FINAL STAGE IN NORMAL FFT COMPUTATION

FINAL STAGE IN PRESENT INVENTION

FFT COMPUTING APPARATUS AND POWER COMPUTING METHOD

REFERENCE TO RELATED APPLICATION

This application is and the National Phase of PCT/JP2010/051491, filed Feb. 3, 2010, which claims the benefit of the priority of Japanese patent application No. 2009-025309 filed on Feb. 5, 2009, the disclosures of which are incorporated herein in their entirety by reference thereto.

TECHNICAL FIELD

The present invention relates to an FFT computing circuit and method, and in particular to an FFT computing circuit suited for use in digital baseband processing in an OFDM system.

BACKGROUND

Normally, in digital baseband processing used in wireless transmission and reception, received signal power (received signal strength) is computed so as to perform control to measure a received signal status and to adjust parameters of a reception circuit according to a result thereof, or to feedback a value to a transmission side, so as to adjust transmission power to an optimum. In particular, in digital baseband processing in an OFDM (Orthogonal Frequency Division Multiplexing) system, a received signal is converted into subcarrier signals by FFT (Fast Fourier Transform) computation processing, and demodulation processing is performed on the subcarrier signal.

There are two methods of computing the power of a received signal:
(a) performing power computation for a received signal before FFT computation processing, and
(b) performing power computation for a subcarrier signal after FFT computation processing.

In (b), by designating a subcarrier signal whose power is to be computed, it is possible to compute the received signal power for a specific frequency range. Thus, for example, it is possible to use a method of computing the received signal power for a frequency exclusively allotted to a specific application, or of computing a frequency characteristic by performing a power comparison for each subcarrier.

For example, in Patent Document 1 (JP Patent Kokai Publication No. JP-A-09-8765), there is disclosed a configuration for computing the power of each of subcarrier signals obtained by performing computation processing, so as to compute a center frequency, and in this way performing frequency correction.

In Patent Document 2 (JP Patent Kokai Publication No. JP-P2002-261727A), there is disclosed a configuration for comparing the power of specific subcarrier out of subcarrier signals obtained by performing FFT computation processing, and selecting a reception antenna, in accordance with a result of the comparison.

These power computations, as shown in FIG. 10, are performed using an arithmetic circuit (power computation circuit) dedicated to power computation, or a processor such as a DSP (Digital Signal Processor), or the like. The power computation circuit or the DSP 702 compute the power from output of an FFT computation unit 701 to be outputted as received signal power.

It is to be noted that, as a butterfly computation in FFT computation, Patent Document 3, for example, discloses a configuration in which a radix 4 third stage can substantially execute with only code conversion and addition processing without multiplication processing, so that the configuration is that of an adder with a small size circuit, and third stage computation is performed in parallel with second stage computation. Furthermore, with regard to an accumulator provided with an adder and a register, reference is made, for example, to Patent Document 4. In addition, for detection of subcarriers in a multicarrier communication system, Patent Document 5 discloses a configuration in which time-direction correlation values of received data signals and replicas of an SCH (Synchronization Channel) symbol sequence are computed for all subcarriers, and subcarriers to which an SCH is assigned are detected based on the computed correlation values.

Patent Document 1

Japanese Patent Kokai Publication No. JP-A-09-8765

Patent Document 2

Japanese Patent Kokai Publication No. JP2002-261727A

Patent Document 3

Japanese Patent Kokai Publication No. JP-P2005-760337A

Patent Document 4

Japanese Patent Kokai Publication No. JP-P2006-33074A

Patent Document 5

Japanese Patent Kokai Publication No. JP-P2006-324859A

SUMMARY

The following analysis is given by the present invention.

A first problem is that in power computation of a received signal after ITT computation processing, in a case of using an arithmetic circuit dedicated to power computation, area overhead occurs due to the dedicated arithmetic circuit.

A second problem is that, in a case of using a processor such as a DSP or the like in power computation of a received signal after FFT computation processing, processing delay due to the power computation increases, and delay time until the received signal power is reported increases.

Furthermore, there is a problem in that computing the received signal power gives a large load to DSP processing, and affects other processing performed in DSP.

Accordingly, it is an object of the present invention to provide an FFT computing apparatus that can suppress increase in circuit area overhead and delay time required for computing received signal power, a communication apparatus including the FFT computing apparatus, and a method therefor.

According to the present invention, there is provided an FFT computing apparatus having a computation-unit switching detection unit that detects timing at which a complex multiplier is not being used in a butterfly computation of FFT (Fast Fourier Transform) computation, and a complex-multiplication power-computation unit that switches computation between complex multiplication and power computation, based on a detection result by the computation-unit switching detection unit, wherein the complex-multiplication power-computation unit performs power computation at timing at which complex multiplication is not carried out in a butterfly computation of the FFT computation. According to the present invention, there is provided a communication apparatus that includes the FFT computing apparatus.

According to the present mention, there is provided a power computation method comprising:
  detecting timing at which complex multiplication is not carried out in a butterfly computation of FFT (Fast Fourier Transform) computation; and
  performing power computation using a complex multiplier at timing at which multiplication is not being carried out in a butterfly computation of FFT computation to perform power computation simultaneously with FFT computation.

According to the present invention, it is possible to suppress increase in circuit area overhead and delay time required for computing received signal power.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 is a diagram showing a butterfly computation flow graph of an 8 point FFT computation;

PREFERRED MODES

The following describes exemplary embodiments of the present invention. According to the present invention, there is provided a means that detects, in a butterfly computation unit performing FFT computation processing, a final stage of FFT computation processing, and a complex-multiplication power-computation unit that can switch between performing complex multiplication and performing power computation. When complex multiplication in the final stage of the FFT computation is not being used, a complex multiplier is switched to a power computation unit and power computation and butterfly computation in the final stage of the FFT computation are simultaneously executed.

Figure 1:
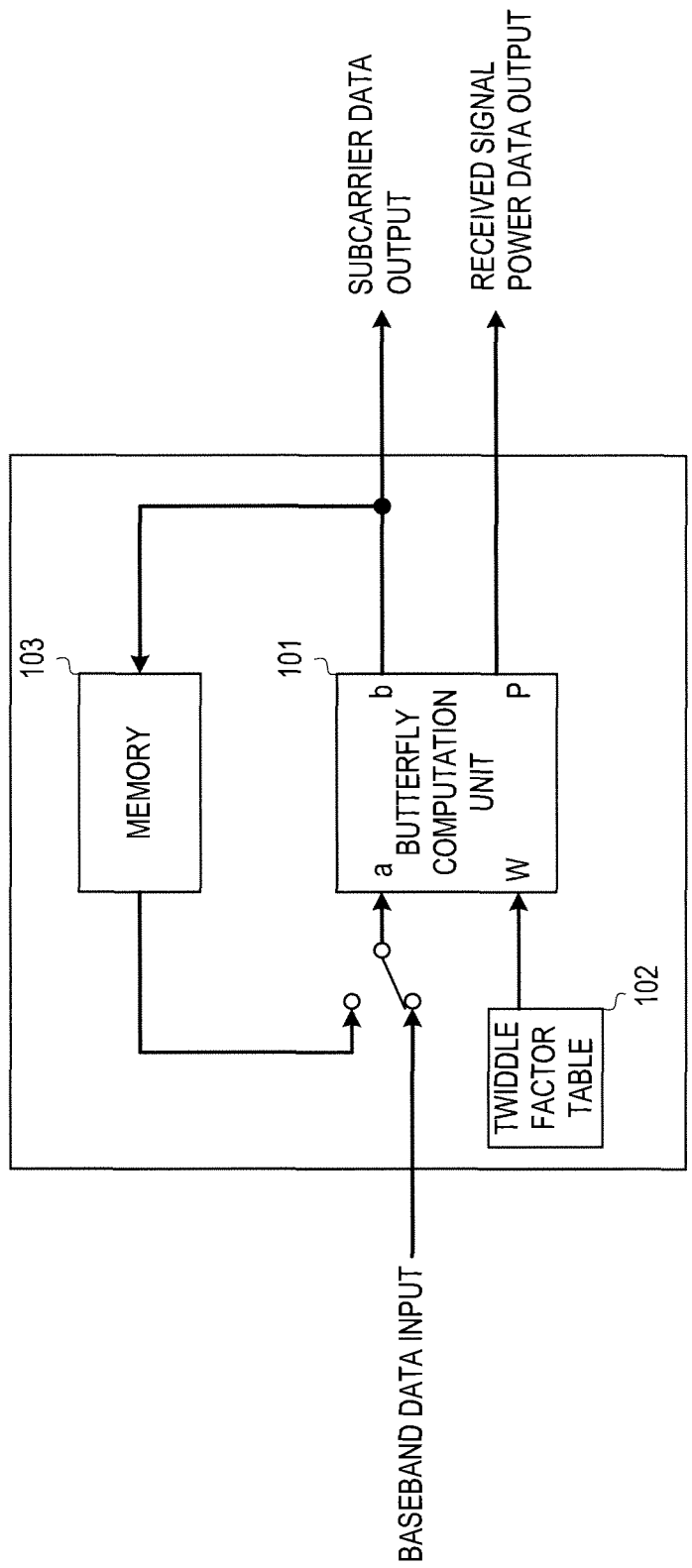
FIG. 1 is a diagram showing a configuration of an FFT computing circuit of an exemplary embodiment of the present invention.
Figure 3:
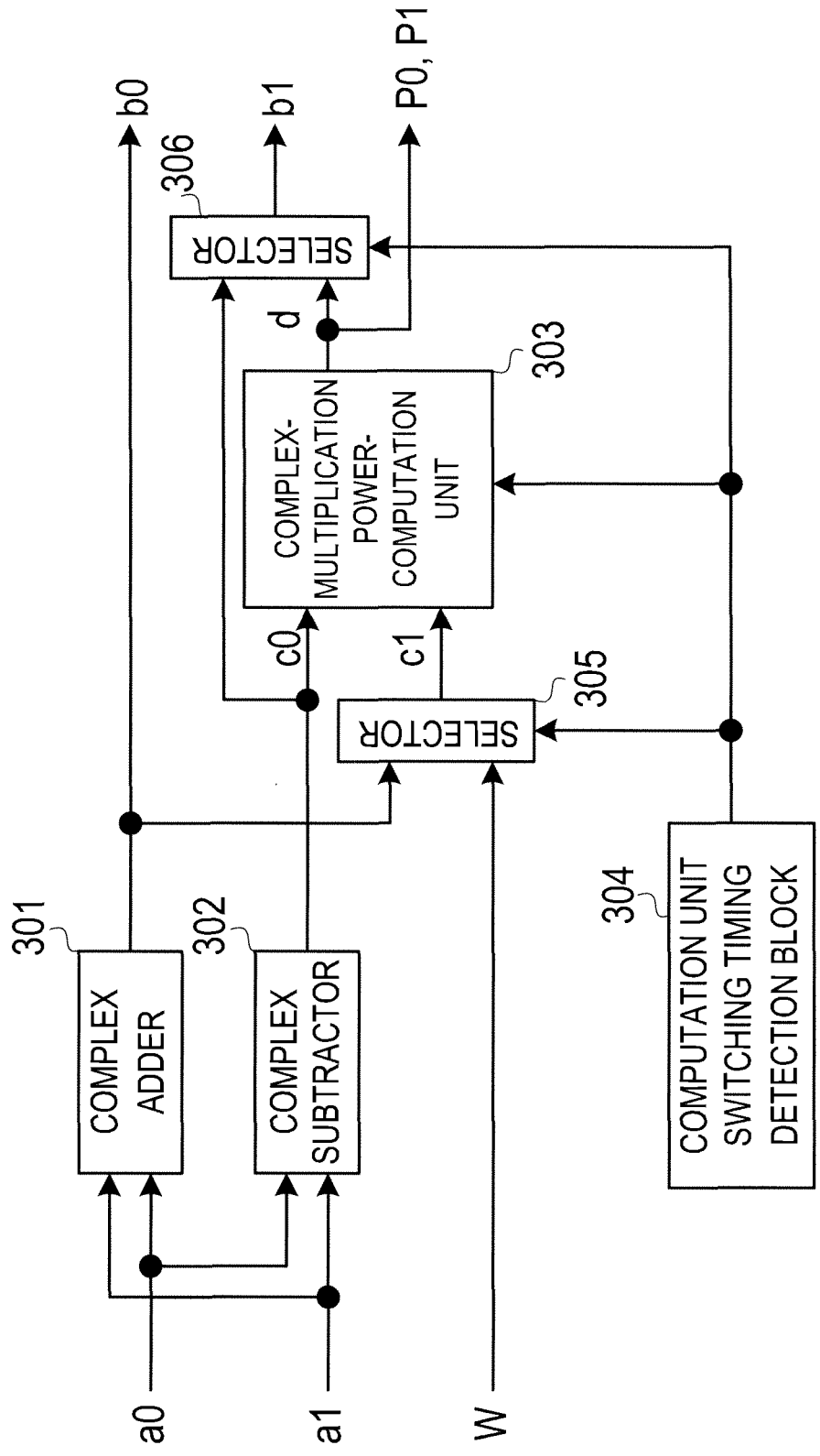
FIG. 3 is a diagram showing a configuration of a butterfly computation unit of an exemplary embodiment of the present invention.

According to the present invention, it is possible to perform power computation simultaneously with the final stage of the FFT computation (FIG. 1 and FIG. 3).

Specifically, in the FFT computation unit according to one of embodiments of the present invention, in a normal stage of FFT computation, normal butterfly computation is performed similar to a conventional FFT computation unit, but in the final stage, a complex multiplier that is not used in butterfly computation is switched to a power computation unit, and power computation is performed while carrying out the butterfly computation in the FFT computation.

Figure 10:
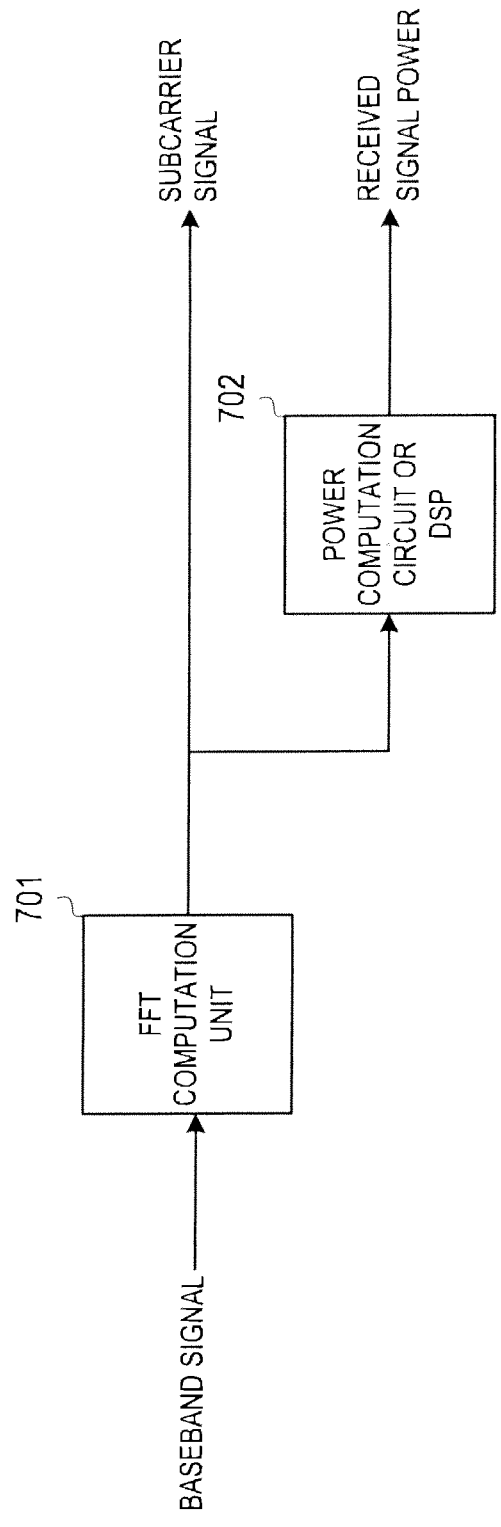
FIG. 10 is a diagram showing a configuration of a received signal power computation means.

In the present embodiment, as compared with a configuration using a power computation dedicated circuit, as shown in FIG. 10, it is possible to reduce circuit area. The reason for this is that a multiplier provided in a complex computation unit which is used in the FFT computation, is used as a multiplier for power computation, there is no need to separately provide a multiplier.

In the present embodiment, delay time needed for received signal power computation is reduced. The reason for this is that since it is possible to perform the power computation simultaneously with the FFT computation, there is no need for time for power computation after the FFT computation.

In the present embodiment, low power consumption is achieved. The reason for this is that since power computation of subcarrier signals obtained in FFT computation is performed in the FFT computation stage, there is no transfer of subcarrier signals to a power-computation unit. Since there is no power consumption due to the transfer of subcarrier signals to a power-computation unit, the power consumption is made lower. The following describes specific exemplary embodiments.

Exemplary Embodiment

FIG. 1 is a diagram showing a configuration of an FFT computation unit according to an exemplary embodiment of the present invention. Referring to FIG. 1, in a first stage, a butterfly computation in a butterfly computation unit 101 is performed with input data (baseband data input) inputted from outside the FFT computation unit and twiddle factor data sent from a twiddle factor table 102, and a result of butterfly computation is stored in a memory 103.

In an intermediate stage, a butterfly computation is performed for data stored in the memory 103 in a previous stage, and twiddle factor data, and a result thereof is stored once again in the memory 103.

In a final stage, subcarrier data obtained by the butterfly computation unit 101 performing butterfly computation to data stored in the memory 103 in an immediately previous stage, is outputted to outside of the FFT computation unit, and at the same time, a received signal power computation result is also outputted.

Figure 2:
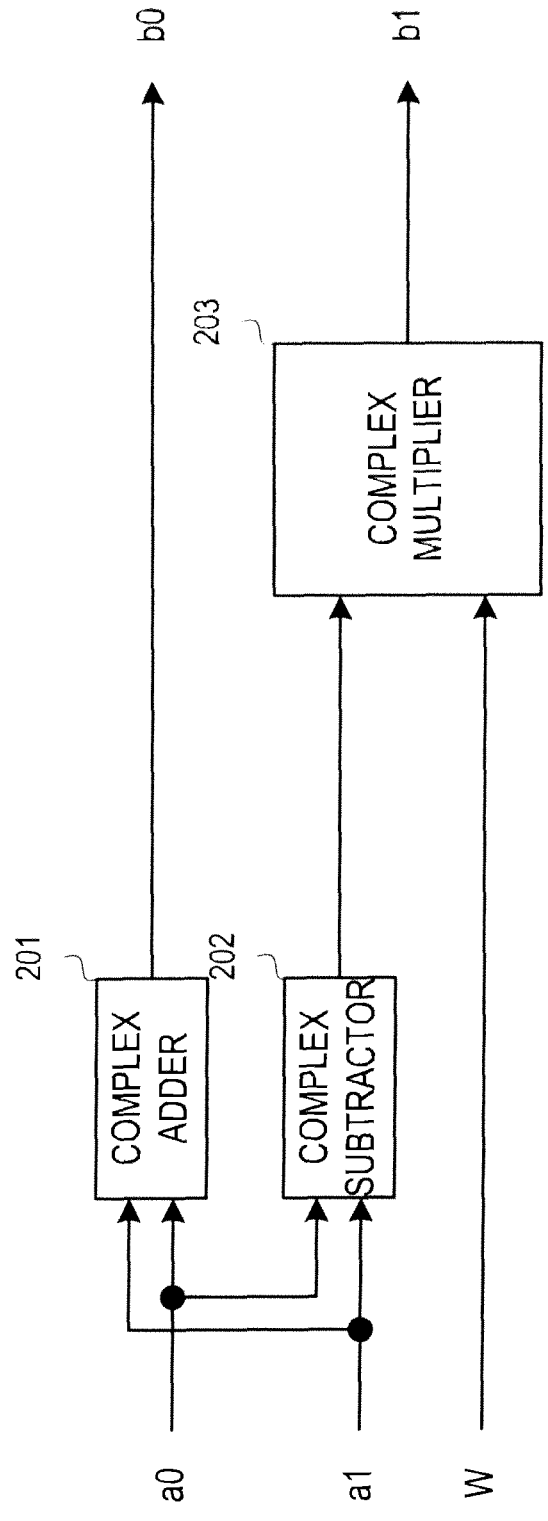
FIG. 2 is a diagram showing a configuration of a butterfly computation unit of a comparative example.

FIG. 2 shows a typical configuration example of a butterfly computation unit, as a comparative example. Referring to FIG. 2, in the butterfly computation unit of this comparative example, a complex adder 201 outputs a result of receiving input of 2 items of data a0 and a1, and performing complex addition to give a0+a1, b0.

A complex subtractor 202 outputs a result of receiving input of 2 items of data a0 and a1, and performing complex subtraction, giving a0−a1.

A complex multiplier 203 outputs a result of multiplying a0−a1 and twiddle factor data W, to give (a0−a1)×W, as complex data b1.

In the final stage, since there is no need for rotation, by applying 1.0 as a twiddle factor, an effect is realized that is the same as where no rotation is performed.

FIG. 3 is a diagram showing a configuration of a butterfly computation unit included in the FFT computation unit according to the present exemplary embodiment. Referring to FIG. 3, the butterfly computation unit is provided with:

(A) a complex adder 301 that receives a0 and a1 as input, and outputs a complex addition result a0+a1, (B) a complex subtractor 302 that receives a0 and a1 as input, and outputs a complex subtraction result a0−a1, (C) a computation unit switching timing detection unit 304 that detects timing at which a complex multiplier is not being used in a butterfly computation, (D) a complex-multiplication power-computation unit 303 that performs switching of power computation and complex multiplication of FFT, based on a control signal (computation unit switching signal) from the computation unit switching timing detection unit 304, (E) a selector 305 that selects twiddle factor data and output of the complex adder 301, based on a control signal (computation unit switching signal) from the computation unit switching timing detection unit 304, and performs switching of input data of the complex-multiplication power-computation unit 303, and (F) an output data switching selector 306 that performs switching of output of the complex subtractor 302 and output of the complex-multiplication power-computation unit 303, based on a control signal (computation unit switching signal) from the computation unit switching timing detection unit 304.

The complex-multiplication power-computation unit 303 performs computation switching to perform complex multiplication of the two input data items a0 and a1 or to perform power computation, in accordance with a state of the control signal from the computation unit switching timing detection unit 304.

In a case of using the complex multiplier in a butterfly computation, the selector 305 selects and outputs twiddle factor data W, the complex-multiplication power-computation unit 303 performs computation of complex multiplication (a0−a1)×W, and the selector 306 selects output of the complex-multiplication power-computation unit 303 and outputs to b1 (=(a0−a1)×W). The output (a0+a1) of the complex adder 301 is outputted as b0.

In the final stage, the complex multiplier is not used in the butterfly computation, the selector 305 selects output of the complex adder 301, the complex-multiplication power-computation unit 303 receives input of output c0 (=a0+a1) of the complex subtractor 302 and output (=a0−a1) of the selector 305, performs power computation, and outputs power P0 and P1. Furthermore, as the butterfly computation output of the final stage, the output (a0+a1) of the complex adder 301 is outputted as b0, and the output (a0−a1) of the complex subtractor 302, selected by the selector 306, is outputted as b1.

The following describes the operation of the FFT computation unit according to the present invention.

FIG. 4 shows a butterfly computation flow graph of an 8 point FFT computation. Here, a place where lines joined at an intersection indicates addition of data, and a place where there is a value under a line indicates multiplication of a data value by that value. All input data and output data of the FFT computation are complex numbers.

In the FFT computation, normally processing is carried out by performing repeated butterfly computation, according to this type of butterfly computation flow graph. For example, in 8 point FFT computation, radix-2 butterfly computation performed 4 times in one stage is executed in 3 stages, and butterfly computation is performed a total of 12 times.

Figure 5A:
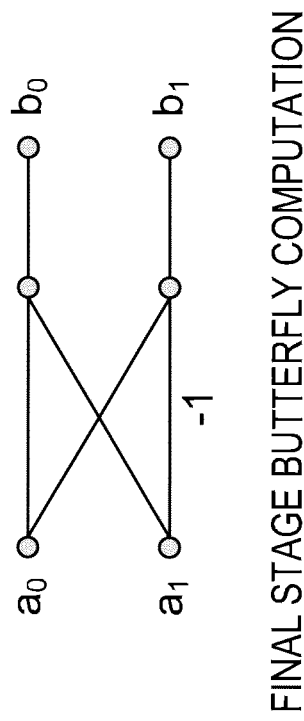
FIGS. 5A and 5B are diagrams showing flow graph of a unit butterfly computation.
Figure 5B:

FIGS. 5A and 5B show flow graph for a unit butterfly computation. For example, in a stage outside of the final stage, as shown in FIG. 5A, butterfly computation of $$b0 = a0 + a1$$

$$b1 = (a0 - a1) \times Wk$$

is performed.

In a unit butterfly computation of the final stage, complex multiplication of twiddle factor data Wk is unnecessary, and as shown in FIG. 5B, computation of $$b0 = a0 + a1$$

$$b1 = a0 - a1$$

is performed.

In this way, the FFT computation has a characteristic in that, in the butterfly computation of the final stage, complex multiplication is not performed. Therefore, in the present invention, as shown in FIGS. 6A-6C, at timing where complex multiplication is not performed in the final stage of the FFT computation, a complex multiplier used in the butterfly computation in a normal stage is used to perform the power computation.

Figure 6A:
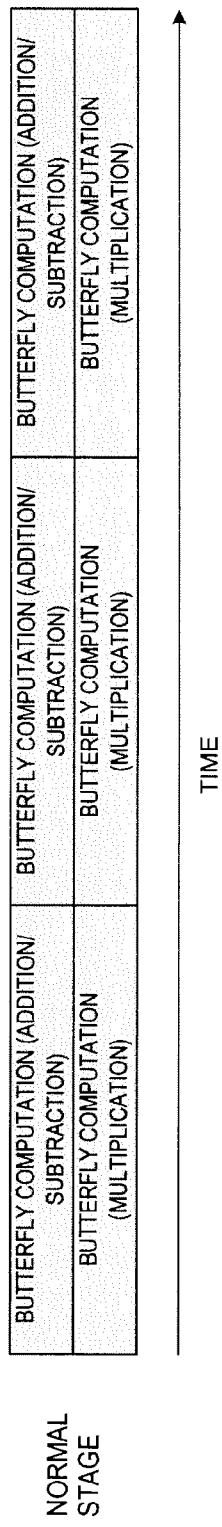
FIGS. 6A, 6B and 6C are diagrams describing operation of a normal stage and a final stage of an FFT computation unit of the present invention and a comparative example.
Figure 6B:
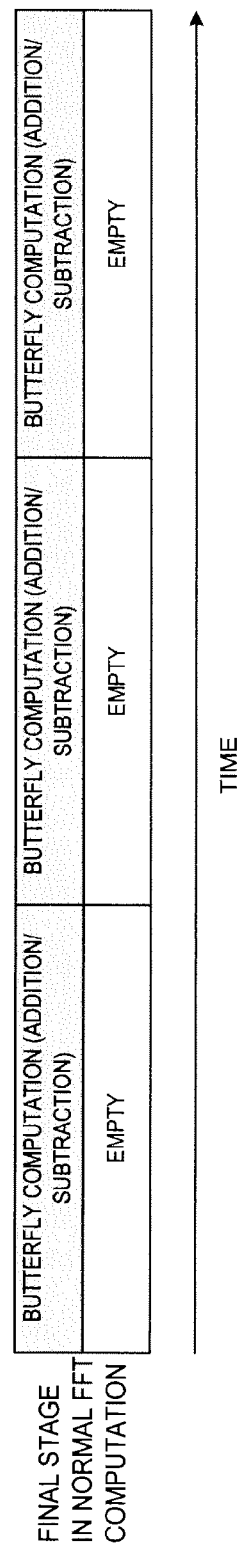
Figure 6C:
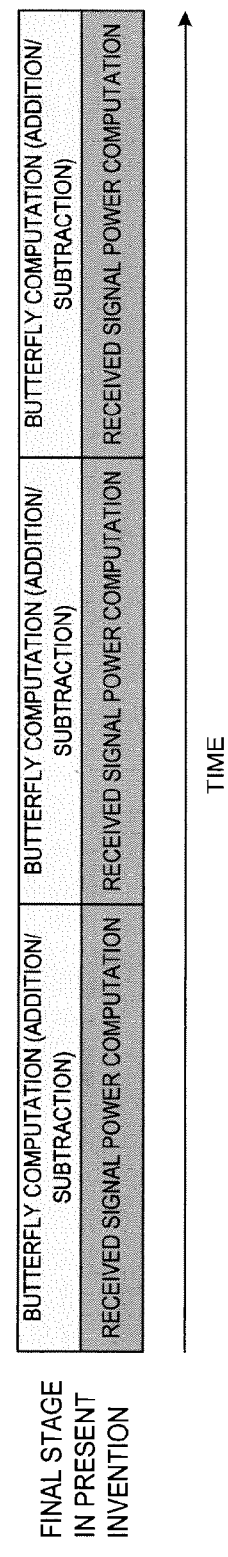

FIG. 6A is a diagram describing operation of the comparative example (normal FFT computation unit) in FIG. 2, and a normal stage (a stage outside of the final stage) of the FFT computation unit of the present exemplary embodiment in FIG. 3. FIGS. 6B and 6C are diagrams respectively describing operation of the comparative example (normal FFT computation unit), and of the final stage of the FFT computation unit of the present exemplary embodiment in FIG. 3. The following describes the flow of butterfly computation in a normal stage in a butterfly computation unit used in the FFT computation unit.

First, complex addition of two input data items a0 and a1 is performed by the complex adder 301, and a result thereof, data b0, is outputted.

At the same time, complex subtraction of two input data items a0 and a1 is performed by the complex subtractor 302, and a result thereof, data c0, is outputted.

In addition, the twiddle factor data W passes through the selector 305 (is selected in the selector 305), and is outputted as data c1.

Complex multiplication of data c0 and data c1 is performed by the complex-multiplication power-computation unit 303, a complex multiplication result is data d, and after passing through the selector 306, data b1 is outputted.

The following describes the flow of butterfly computation and power computation in the final stage in the butterfly computation unit used in the FFT computation unit of FIG. 3.

In the final stage, computation unit switching timing is detected by the computation unit switching timing detection unit 304, a control signal is switched, and as a result, input data is selected by the selector 305 and the selector 306, and the type of computation of the complex-multiplication power-computation unit 303 is switched.

At this time, complex addition of two input data items a0 and a1 is performed by the complex adder 301, and as a result, data b0 is outputted. At the same time, complex subtraction of two input data items a0 and a1 is performed by the complex subtractor 302, and a complex subtraction result thereof, data c0, is outputted. The complex subtraction result, data c0 (=a0−a1) passes through the selector 306, and is outputted as output data b1.

Output data b0 (=a0+a1) is selected by the selector 305 and data c1 is obtained.

The complex subtraction result, data c0, and data c1 are inputted to the complex-multiplication power-computation unit 303, respective data power values of the data c0 and the data c1 are computed, and data obtained by concatenating these power values is outputted as received signal power output data P0 and P1.

In this way, in the FFT computation unit of the present invention, the received signal power data is outputted simultaneously with FFT result data.

Figure 8:
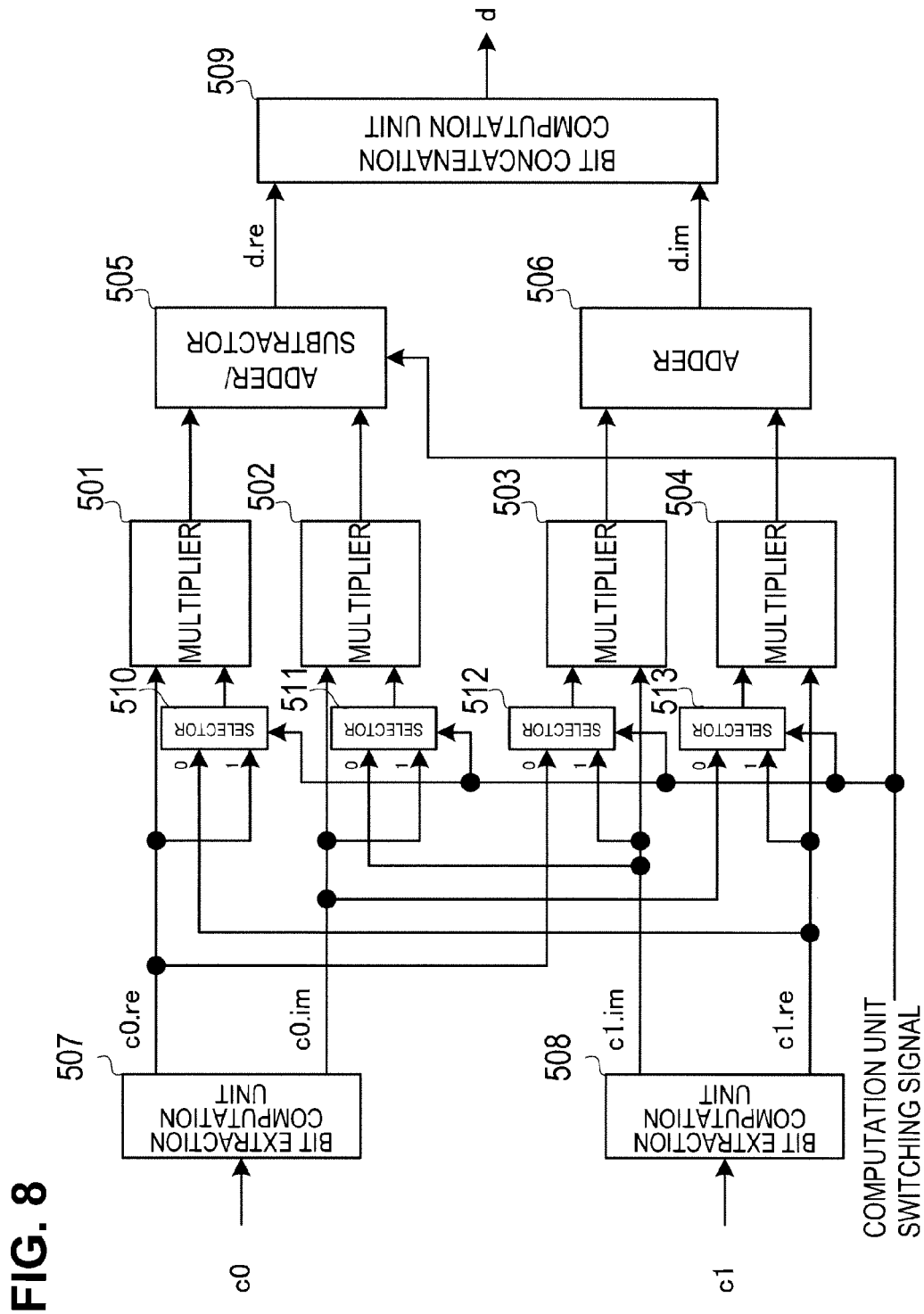
FIG. 8 is a diagram showing an exemplary embodiment of a complex-multiplication power-computation unit of one exemplary embodiment of the present invention.

Next, a configuration example of the complex-multiplication power-computation unit 303 used as a part of the butterfly computation unit of FIG. 3 is shown in FIG. 8. Referring to FIG. 8, the complex-multiplication power-computation unit 303 includes four multipliers 501, 502, 503, and 504, an adder/subtractor 505 that switches between addition and subtraction, and adder 506, selectors 510, 511, 512, and 513 that switch input data, bit extraction computation units (407, 408) that separate complex numerical data into a real part (re) and an imaginary part (im), and a bit concatenation computation unit 409 that generates complex numerical data from real part (re) data and imaginary part (im) data.

In the complex-multiplication power-computation unit 303 for which a configuration is shown in FIG. 8, switching is performed by a computation unit switching signal with regard to performing complex multiplication of two input data items c0 and c1, or performing power computation of the two input data items c0 and c1.

First, when computation of complex multiplication is performed, the selectors (510, 511, 512, and 513) are set by a computation unit switching signal, such that input on a 0 side is selected, and the adder/subtractor 505 performs subtraction. In this case, the input data c0 is broken up into a real part (r0.re) and an imaginary part (c0.im) by a bit extraction computation unit 407, and the input data c1 is broken up into a real part (r1.re) and an imaginary part (c1.im).

The real part (c0.re) of c0 and the real part (c1.re) of c1 are inputted to the multiplier 501, and the multiplier 501 outputs (c0.re)×(c1.re).

The imaginary part (c0.im) of c0 and the imaginary part (c1.im) of c1 are inputted to the multiplier 502, and the multiplier 502 outputs (c0.im)×(c1.im).

The real part (c0.re) of c0 and the imaginary part (c1.im) of c1 are inputted to the multiplier 503, and the multiplier 503 outputs (c0.re)×(c1.im).

The imaginary part (c0.im) of c0 and the real part (c1.re) of c1 are inputted to the multiplier 504, and the multiplier 504 outputs (c0.im)×(c1.re).

The computation result (c0.re)×(c1.re) of the multiplier 501 and the computation result (c0.im)×(c1.im) of the multiplier 502 are inputted to the adder/subtractor 505, and a result (c0.re)×(c1.re)−(c0.im)×(c1.im) of subtracting the computation result of the multiplier 502 from the computation result of the multiplier 501 forms a real part (d.re) of the output data.

In the same way, the computation result (c0.re)×(c1.im) of the multiplier 503 and the computation result (c0.im)×(c1.re) of the multiplier 504 are inputted to the adder 506, and a result (c0.re)×(c1.im)+(c0.im)×(c1.re) of adding the computation result of the multiplier 503 and the computation result of the multiplier 504 forms an imaginary part (d.im) of the output data.

These results are concatenated by the bit concatenation computation unit 409, and form output data.

When computation of power computation is performed, the selectors (510, 511, 512, and 513) are set by a computation unit switching signal, such that input on a 1 side is selected, and the adder/subtractor 505 performs addition.

In this case, the input data c0 is broken up into a real part (r0.re) and an imaginary part (c0.im) by the bit extraction computation unit 407.

The input data c1 is broken up into a real part (r1.re) and an imaginary part (c1.im) by the bit extraction computation unit 408.

The real part (c0.re) of c0 is inputted to both input ports of the multiplier 501, and the multiplier 501 outputs (c0.re)×(c1.re).

The imaginary part (c0.im) of c0 is inputted to both input ports of the multiplier 502, and the multiplier 502 outputs (c0.im)×(c0.im).

The imaginary part (c1.im) of c1 is inputted to both input ports of the multiplier 503, and the multiplier 503 outputs (c1.im)×(c1.im).

The real part (c1.re) of c1 is inputted to both input ports of the multiplier 504, and the multiplier 504 outputs (c1.re)×(c1.re).

The computation result of the multiplier 501 and the computation result of the multiplier 502 are inputted to the adder/subtractor 505, and a result (c0.re)×(c0.re) (c0.im)×(c0.im) of adding the computation result of the multiplier 501 and the computation result of the multiplier 502 forms a real part (d.re) of the output data.

In the same way, a computation result of the multiplier 503 and a computation result of the multiplier 504 are inputted to the adder 506, and a result (c1.im)×(c1.im)+(c1.re)×(c1.re) of adding the computation result of the multiplier 503 and the computation result of the multiplier 504 forms an imaginary part (d.im) of the output data.

The real part (d.re) of the output data shows the power of c0, and the imaginary part (d.im) of the output data shows the power of c1. These results are concatenated by the bit concatenation computation unit 409, and form output data.

Figure 7:
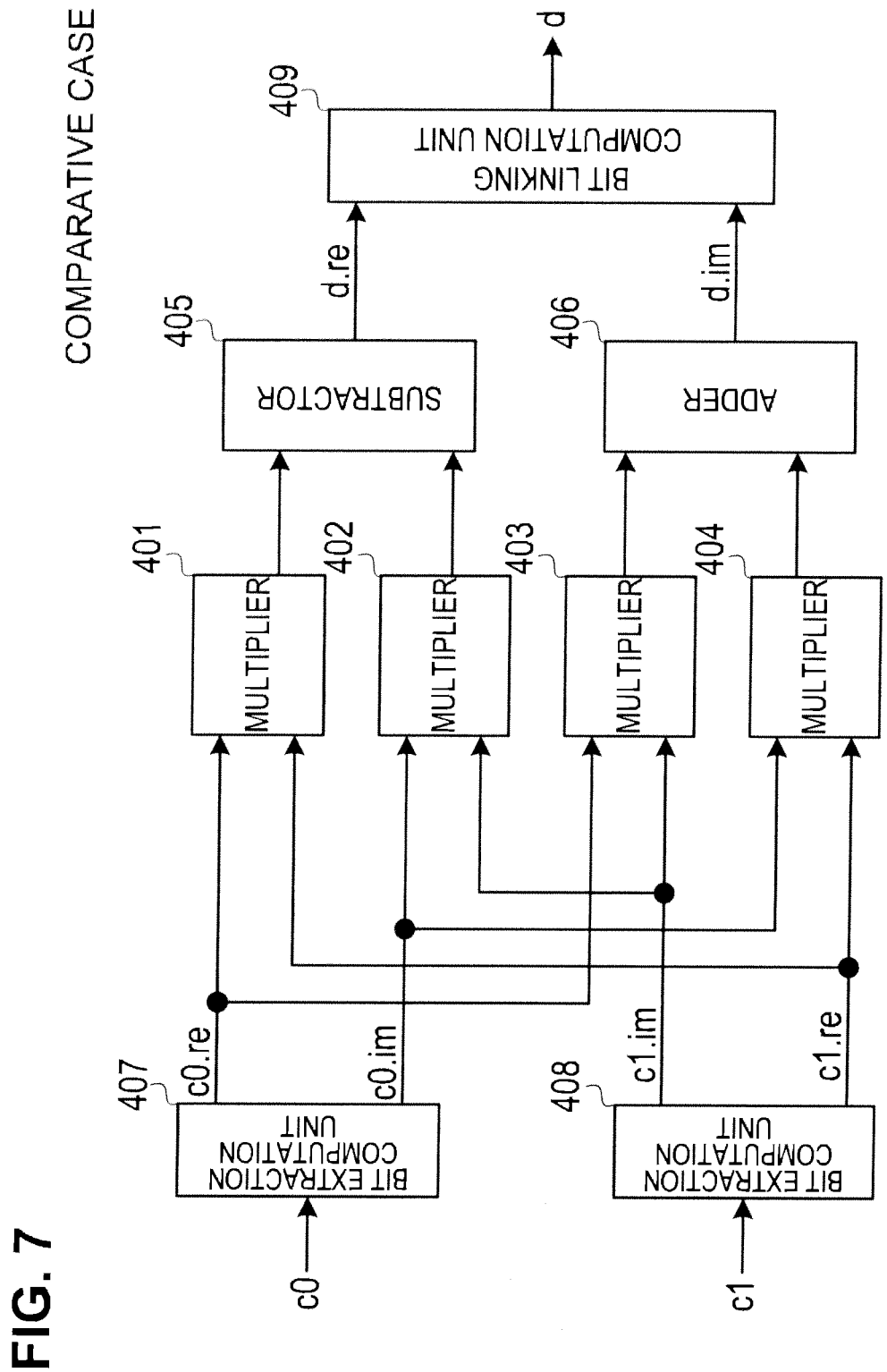
FIG. 7 is a diagram showing a configuration of a butterfly computation unit of a comparative example.

FIG. 7 is a diagram showing a configuration of a complex multiplier of a comparative example in order to compare with the configuration of the multiplication power-computation unit of FIG. 8. Referring to FIG. 7, the complex multiplier of the comparative example is not provided with a selector of FIG. 8 but is provided with an adder/subtractor 501 instead of the subtractor 406.

Figure 9:
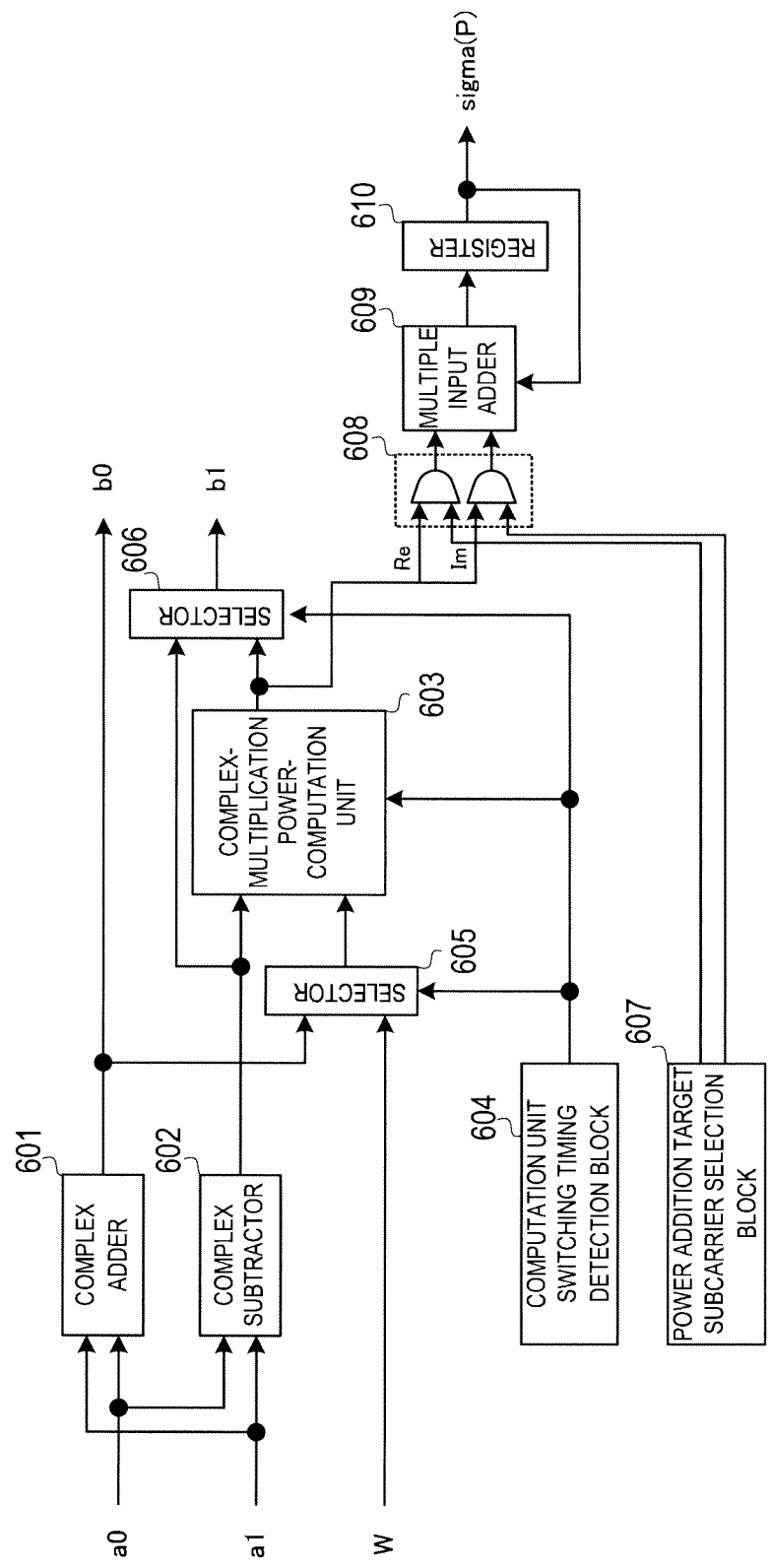
FIG. 9 is a diagram showing a configuration of a butterfly computation unit of a second exemplary embodiment of the present invention.

FIG. 9 is a diagram showing a configuration of a butterfly computation unit of a second exemplary embodiment of the present invention. Referring to FIG. 9, in the present exemplary embodiment, in this butterfly computation unit, received signal power of a subcarrier signal is not outputted as it is, but a result of accumulating the power of a selected subcarrier signal is outputted.

In the butterfly computation unit similar to the butterfly computation unit of FIG. 3, in a final stage, the received signal power is outputted in output of a complex-multiplication power-computation unit 603.

With regard to the outputted received signal power, a determination is made as to whether or not this is a subcarrier for which accumulation of power is performed by a power addition target subcarrier selection unit 607; power data of a subcarrier for which addition is performed is passed as it is, by an AND circuit 608; and otherwise, 0 is obtained.

These power data items are inputted together with data stored in a register 610 to a multiple input adder 609, and a result of addition by the multiple input adder 609 is stored in the register 610.

All the power of the subcarriers for which accumulation is performed is added, and when stored in the register 610, this value is outputted to the outside of the butterfly computation unit (sigma (P)). It is to be noted that in FIGS. 6A-6C, a computation unit switching timing detection unit 604, a complex adder 601, a complex subtractor 602, the complex-multiplication power-computation unit 603, a selector 605, and an output data switching selector 606, respectively correspond to the computation unit switching timing detection unit 304, the complex adder 301, the complex subtractor 302, the complex-multiplication power-computation unit 303, the selector 305, and the output data switching selector 306, and descriptions are omitted.

The present invention is applied to radio apparatuses and the like, such as a mobile telephone and the like.

It is to be noted that each of the disclosures in the above-mentioned patent documents is incorporated herein by reference. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

The invention claimed is:

1. An FFT computing apparatus comprising:
a computation-unit switching detection unit that detects timing at which a complex multiplication is not being carried out in a butterfly computation of FFT (Fast Fourier Transform) computation; and
a complex-multiplication power-computation unit that switches computation between complex multiplication and power computation, based on a detection result by said computation-unit switching detection unit, wherein said complex-multiplication power-computation unit performs power computation at timing at which complex multiplication is not carried out in said butterfly computation of FFT computation.

2. The FFT computing apparatus according to claim 1, wherein timing at which complex multiplication is not being used in said butterfly computation is a final stage of FFT computation, said complex-multiplication power-computation unit performing power computation at said final stage of FFT computation.

3. The FFT computing apparatus according to claim 1, comprising:
a power addition target subcarrier selection unit that selects a subcarrier that is a target of power addition; and
an adder and register that accumulate received signal power of a subcarrier that is a target of power addition, wherein a total of received signal power of a subcarrier for which power addition is performed is outputted.

4. The FFT computing apparatus according to claim 1, wherein a butterfly computation unit that performs said butterfly computation comprises:
a complex adder that receives first and second complex signals and outputs a result of addition of said first and second complex signals;
a complex subtractor that receives said first and second complex signals and outputs a result of subtracting said second complex signal from said first complex signal;
a first selector that receives twiddle factor data and output data of said complex adder, and selects and outputs one thereof in accordance with a control signal that is a detection result from said computation-unit switching detection unit;
a complex-multiplication power-computation unit that receives output of said complex subtractor and output of said first selector and that performs computational operation in either one out of a complex multiplier and a power computation unit to perform a computational operation of a computation unit, in accordance with said control signal from said computation-unit switching detection unit, said complex multiplier outputting a value obtained by multiplying output from said complex subtractor by said twiddle factor data, said power computation unit computing power from output of said complex adder and output of said complex subtractor; and
a second selector that receives output of said complex subtractor and output of said complex-multiplication power-computation unit, and selects and outputs one thereof in accordance with said control signal from said computation-unit switching detection unit.

5. The FFT computing apparatus according to claim 4, comprising:
an adder; and
a register that holds output of said adder, wherein said adder accumulates and adds power by adding output from said complex-multiplication power-computation unit and a value of said register, and holding an addition result in said register.

6. The FFT computing apparatus according to claim 5, wherein output from said complex-multiplication power-computation unit and input of said adder are controlled so as to accumulate and add power of a selected subcarrier.

7. The FFT computing apparatus according to claim 1, wherein said complex-multiplication power-computation unit comprises:
a first bit extraction computation unit that receives output of said complex subtractor and separates said output of said complex subtractor received into a first real part and a first imaginary part;
a second bit extraction computation unit that receives output of said first selector and separates said output of said first selector received into a second real part and a second imaginary part;
a first selector that receives as first and second inputs said first real part and said second real part, and selects and outputs one thereof, in accordance with said control signal from said computation-unit switching detection unit;
a second selector that receives as first and second inputs said second imaginary part and said first imaginary part, and selects and outputs one thereof, in accordance with said control signal from said computation-unit switching detection unit;
a third selector that receives as first and second inputs said first real part and said second imaginary part, and selects and outputs one thereof, in accordance with said control signal from said computation-unit switching detection unit;
a fourth selector that receives as first and second inputs said first imaginary part and said second real part, and selects and outputs one thereof, in accordance with said control signal from said computation-unit switching detection unit;

a first multiplier that receives as first and second inputs said first real part and output of said first selector, and outputs a result of multiplication of said first and second inputs;

a second multiplier that receives as first and second inputs said first imaginary part and output of said second selector, and outputs a result of multiplication of said first and second inputs;

a third multiplier that receives as first and second inputs output of said third selector and said second imaginary part, and outputs a result of multiplication of said first and second inputs;

a fourth multiplier that receives as first and second inputs output of said fourth selector and said second real part, and outputs a result of multiplication of said first and second inputs;

an adder/subtractor that receives as first and second inputs outputs of said first and second multipliers, and outputs a result of addition of said first and second inputs or a result of subtraction of said first and second inputs, in accordance with said control signal from said from said computation-unit switching detection unit;

an adder that receives as first and second inputs outputs of said third and fourth multipliers, and outputs a result of addition of said first and second inputs; and a bit concatenation computation unit that receives first and second inputs of output of said adder/subtractor and output of said adder, and generates output data.

8. A communication apparatus comprising the FFT computing apparatus according to claim 1.

9. A power computation method comprising:

detecting, by an FFT computing apparatus, timing at which complex multiplication is not carried out in a butterfly computation of FFT (Fast Fourier Transform) computation; and performing, by said FFT computing apparatus, power computation using a complex multiplier at timing at which multiplication is not being carried out in a butterfly computation of FFT computation to perform power computation simultaneously with FFT computation.

10. The method according to claim 9, wherein timing at which complex multiplication is not being carried out in said butterfly computation is a final stage of FFT computation, said method comprising:

performing, by said FFT computing apparatus, said power computation at said final stage of FFT computation.

* * * * *